March 15, 1960 B. O'C. PARKER 2,928,578
MATERIALS HANDLING PALLET AND METHOD OF MAKING SAME
Filed Aug. 16, 1956 4 Sheets-Sheet 1
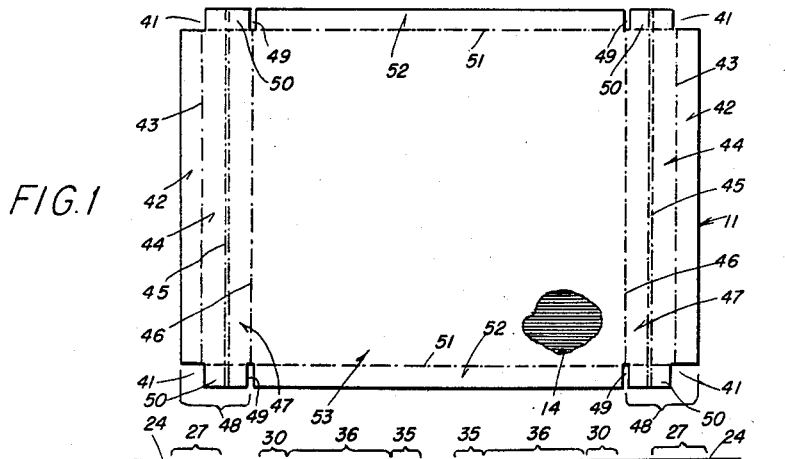
FIG.1
FIG.2
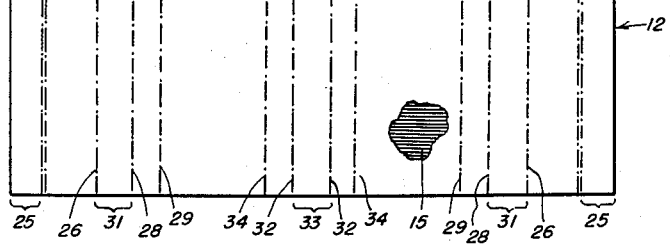
FIG.10
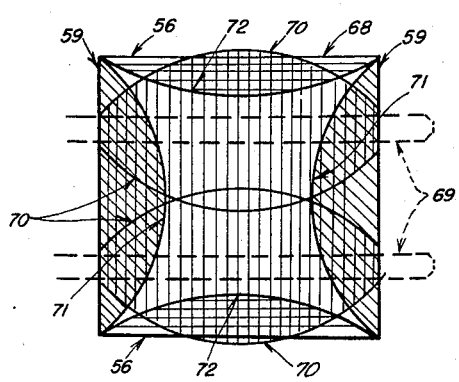

March 15, 1960 B. O'C. PARKER 2,928,578
MATERIALS HANDLING PALLET AND METHOD OF MAKING SAME
Filed Aug. 16, 1956 4 Sheets-Sheet 2
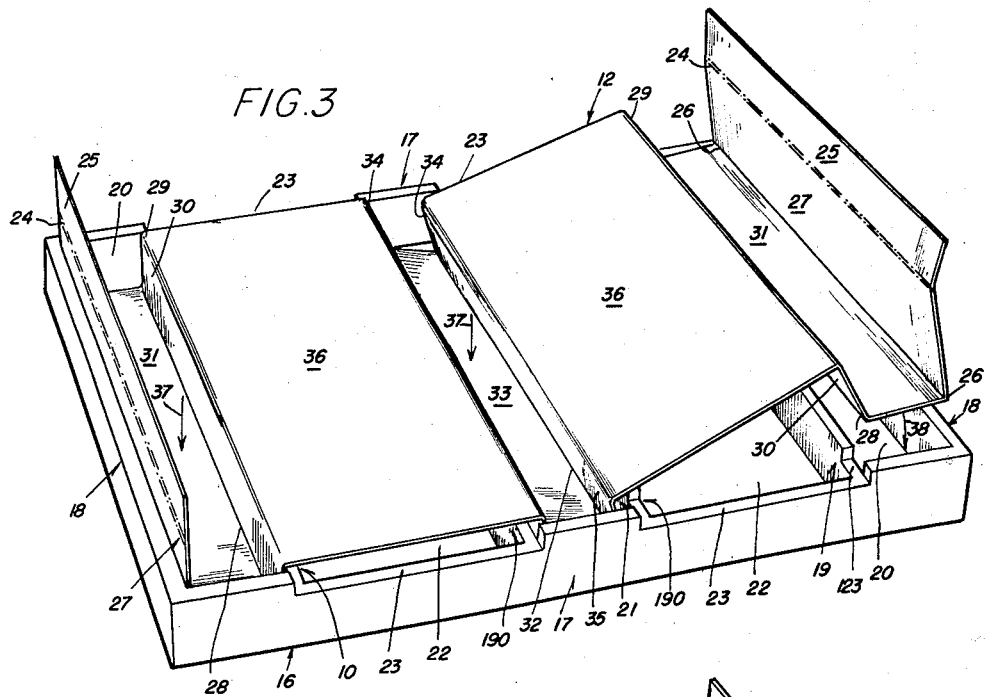
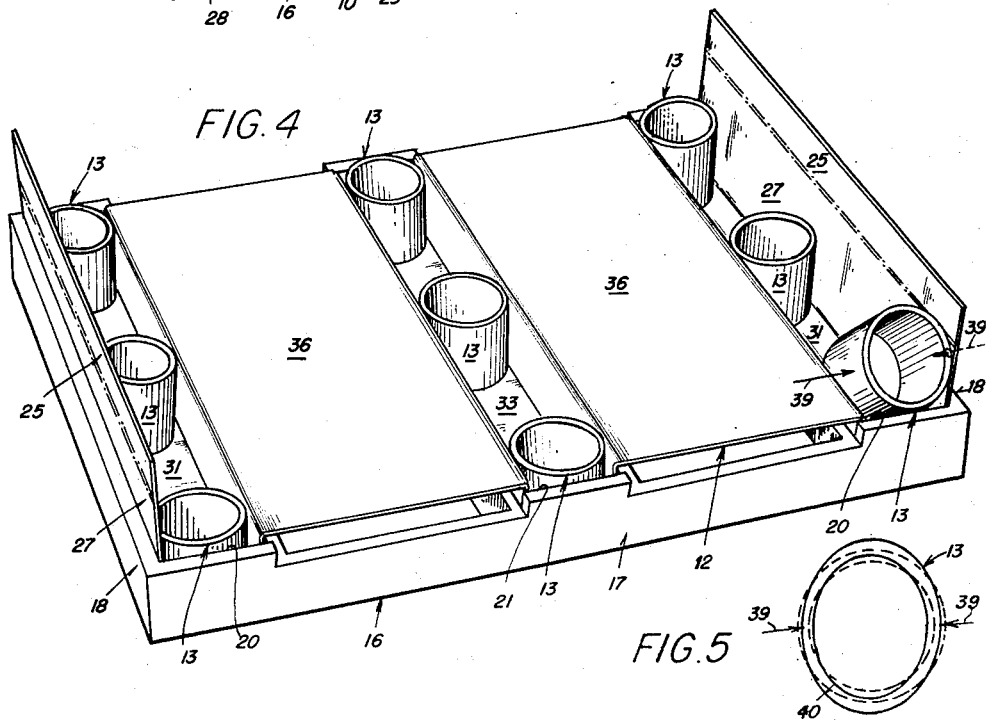

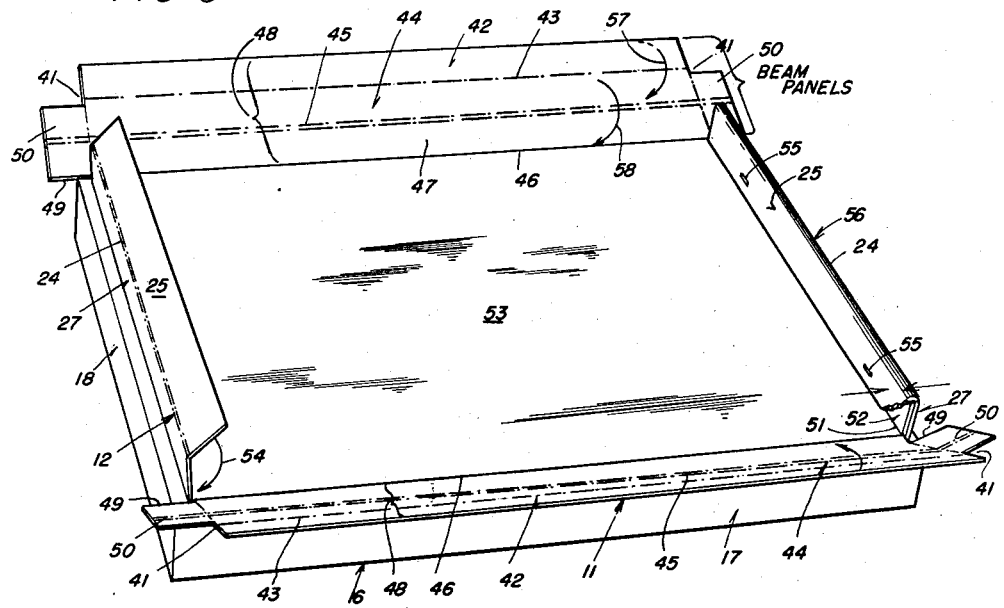
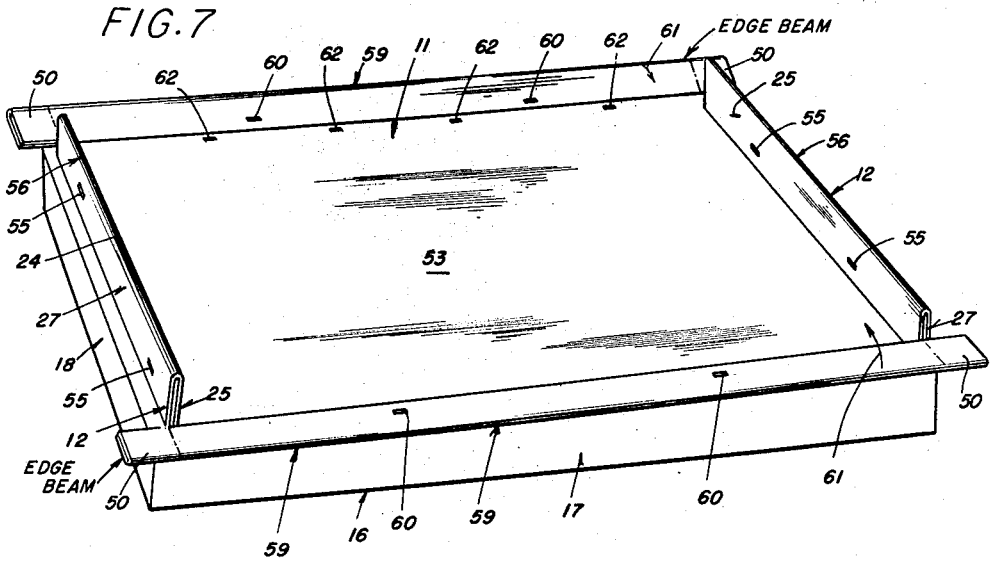

March 15, 1960 B. O'C. PARKER 2,928,578
MATERIALS HANDLING PALLET AND METHOD OF MAKING SAME
Filed Aug. 16, 1956 4 Sheets-Sheet 4

2,928,578

MATERIALS HANDLING PALLET AND METHOD OF MAKING SAME

Brooks O'C. Parker, New York, N.Y.

Application August 16, 1956, Serial No. 604,522

10 Claims. (Cl. 229—6)

The present invention relates to portable materials handling pallets designed to support thereon loads, each of which may be made up of a plurality of units, for facilitating handling of such loads by fork lift trucks.

A general object of the present invention is to provide such a materials handling pallet in a form which can be easily and economically made in a simple manner readily adapted to relatively low cost mass production procedures, and which is of such formation as to retain thereon, in an efficient manner, a plurality of separate units which may together constitute a load while protecting against strapping and bumping damage to outside units of such load; such pallet structure providing a load-supporting top deck and top beam means for the deck to carry certain portions of static load remote from fork lift tines entered in bottom channels of the pallet; and to provide a unique method of making embodiments of such pallet and assembling parts thereof.

A more specific object of the present invention is to provide such pallet in the form of a top deck tray having upstanding edge beams for efficiently supporting in suspension portions of static load remote from fork tine-receiving cross channels defined between transverse bottom beam means or transversely-elongated column structures with the tray edges additionally serving to secure load units thereon and effectively protecting the load units adjacent thereto from strapping and bumping damage.

An additional object of the present invention is to provide a unique and simple method of assembling in a rapid manner parts of certain embodiments of such a pallet which efficiently minimizes need for connecting certain parts together while assuring that they are held securely in their relative assembled positions.

A further object of the invention is to provide structural embodiments of the device which are readily and economically constructed and permit efficient use and operation thereof, while being of such low cost construction as to allow discard after a single load transportation use thereof.

Other objects of the invention will in part be obvious and will in part appear hereinafter.

The invention accordingly comprises the expendable pallet possessing the features, properties and the relation of elements, and the several steps of the method of assembly of such pallet and the relation of one or more of such steps with respect to each of the others, which are exemplified in the following detailed disclosure, and the scope thereof will be indicated in the claims.

For a fuller understanding of the nature and objects of the invention reference should be had to the following detailed description taken in connection with the accompanying drawings, in which:

Fig. 1 is a plan view to reduced scale, with a part broken away, of a top or deck sheet part of an embodiment of the materials handling pallet of the present invention;

Fig. 2 is a similar plan view, with a part broken away, of a bottom sheet part of such embodiment;

Fig. 3 is a perspective view to a larger scale of the bottom sheet of Fig. 2 and of a form into which this sheet is folded, and illustrating certain initial steps of the method of making such embodiment;

Fig. 4 is a perspective view similar to Fig. 3, showing such bottom sheet part completely seated in the form, and illustrating distorting nesting in channels thereof of a plurality of pedestal or column elements forming additional parts of such embodiment;

Fig. 5 is a top plan view to a still larger scale of one of the pedestal or column elements, indicating in dotted lines the cross-sectional shape thereof before nesting distortion and in full lines such shape after the distortion attendant upon the nesting thereof in one of the bottom sheet channels, the indicated distortion being exaggerated therein for clarity;

Fig. 6 is a perspective view similar to Fig. 5, illustrating the subsequent seating of the top deck sheet part of Fig. 1 on the bottom sheet part of Fig. 2 in the folding form and upon the nested pedestal or column elements, indicating certain manipulations and fastening together of both sheet parts of the depicted embodiment;

Fig. 7 is a perspective view similar to Fig. 6, illustrating additional manipulative and fastening steps of the method of the invention;

Fig. 10 is a diagrammatic plan view of the device illustrating its use in supporting a static load on tines of a lift fork indicated therein by dotted lines, and diagrammatically indicating distribution of portions of the static load.

Figure 8:
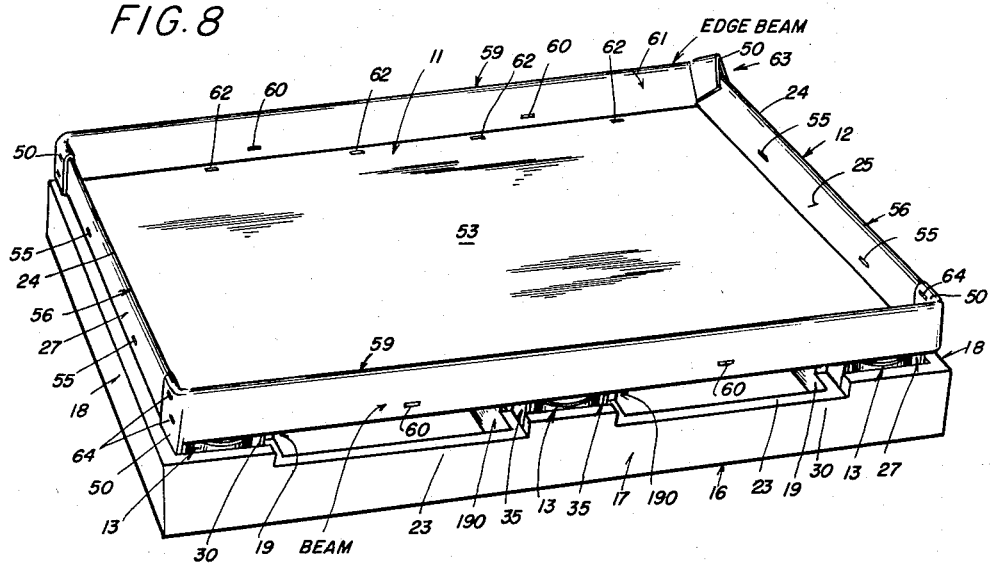
Fig. 8 is another perspective view similar to Figs. 6 and 7, depicting further and final manipulative and fastening steps.

Referring to the drawings in which like numerals identify similar parts throughout, it will be seen that an embodiment of the present invention, which is structurally adapted to ready manufacture in mass production by simple procedure, the steps of which are illustrated therein, may comprise three standardized parts, viz., a top deck sheet 11, a bottom sheet 12 and a plurality of pedestal or column elements 13—13. It is to be understood that features of the present invention and their embodiment in pallets are not limited to the particular form of the pallet shown in the drawings or the procedural steps of assembly of parts illustrated therein and variations within the scope of the invention will occur to one skilled in the art after an understanding of the description and explanation of the shown embodiment and illustrated method here following.

The composition of the sheet material from which the deck sheet 11 and the bottom sheet 1 are formed may vary depending upon circumstances of construction and use. Preferably the sheet material may comprise a paperboard although, for certain uses, it may be desired to employ light gauge metal. The paperboard may be one of common or conventional materials intended for use in the construction of pallets, particularly of the expendable type, and of standard thickness. It is intended that the term "paperboard," as used herein, be understood to have been employed in the sense of identification of various types of composition sheet material which is light in weight and capable of being folded along break lines and in the manner to be described. It may comprise one of various kinds of cellulose materials impregnated, if desired, with plastic materials, or it may comprise an appropriate plastic sheet material and include, if desired, reinforcement. Corrugated paper is particularly advantageous for the purpose since it provides high strength and rigidity relative to weight and cost, is cheap enough to permit such economy as to allow discard of a pallet constructed therefrom after a single use, and is readily adapted to the manipulative steps of assembly of parts. When corrugated paper is employed, the sheet parts should be so oriented that the flutes thereof run or extend transversely of the beam structures and, for example, the flutes may be oriented in the sheet parts 11 and 12 as indicated at 14 in Fig. 1 and 15 in Fig. 2 where the flutes are exposed to view by break away of a portion of the covering ply.

The structure and composition of the pedestal or column elements or parts 13—13 also are subject to similar variations and may be formed from a wide variety of composition sheet material including light gauge metal. In most cases, paperboard tubular sections will be employed for the pedestal or column elements 13—13 and chipboard may be preferred for this purpose due to its relatively high strength and relative rigidity in relation to weight and cost, because of an economy in use thereof, and due to the natural resiliency of sidewalls of chipboard tubes necessary to one feature which may be employed to advantage in an embodiment of the invention, as will be explained later.

Assembly of the parts of the embodiment of the pallet of the present invention, which is illustrated by way of example in the drawings, employs to advantage a simple assembly jig or form 16, illustrated in Figs. 3, 4, 6, 7 and 8. As best seen from Fig. 3, the assembly jig or form 16 may comprise a rectangular frame having opposed upstanding sidewalls 17, 17 and opposed upstanding endwalls 18, 18 together forming a box-like structure. Transverse upstanding partition walls 19, 19 cooperate with the endwalls 18, 18 to define therebetween wells 20, 20 in which depending beam structures are formed. If it is desired to provide a central depending beam structure in the pallet, additional partition walls 190, 190 are extended across between the jig or form sidewalls 17, 17 to form a central well 21. At the ends of the spaces 22, 22 intervening the partition walls 19, 190 and 19, 190, the top edges of the jig sidewalls 17, 17 are notched at 23—23 and the adjacent top edges of these partition walls are cut back at 123—123, as shown in Figs. 3 and 4, to provide access to the bottom side of panels of the bottom sheet 12 for purposes of fastening them to areas of the deck sheet 11, as in the manner and for the purpose explained later.

Referring to Fig. 2, it will be seen that the bottom sheet 12 is substantially or generally rectangular and when employed to construct a pallet having a deck tray structure of inside dimensions of about 40.75″ x 47″, such bottom sheet may be about 74.9375″ long and about 47.75″ wide, and may be formed of "B" flute corrugated paper having face plies on both sides of the fluted ply and a punching test strength of about 200 lbs. The bottom sheet 12 is transversely scored thereacross with double lines at 24, 24 to define end zones or flaps 25, 25. Additional transverse score lines 26, 26 define with the double score lines 24, 24 panels 27, 27 which are to have a double purpose, explained later. Two sets of score lines 28, 29 and 28, 29 provide respectively panels 30, 30 with the score lines 28, 28 cooperating with the score lines 26, 26 to define panels 31, 31. Medially of the bottom sheet 12 additional score lines are preferably provided with those at 32, 32 defining a central panel 33 and flanking score lines 34, 34 cooperating therewith to define flanking panels 35, 35. Score lines 29, 34 and 29, 34 respectively define therebetween inverted channel panels 36, 36. The width of each end zone or flap 25 may be about 2.375″ and the width of each panel 27 may be about 6.625″. Each of the panels 31, 31 and 33 may be about 4.6875″ wide and the panels 30, 30, 35 and 35 may be about 3.75″ wide. This will make each of the panels 36, 36 about 13.6875″ wide.

As will be seen from Fig. 3, the scored bottom sheet 12 is broken or forced into the assembly jig or form 16 with folding or bending of the sheet along the scored lines 26, 26; 28, 28; 29, 29; 34, 34 and 32, 32. In this step of breaking the bottom sheet 12 into the assembly jig or form 16, as such step is illustrated in Fig. 3, one end portion of the sheet is there shown to have been forced down into the form in the direction of the arrows 37, 37 with one of the wells 20 receiving a lower portion of one of the panels 27, the panel 31 and the panel 30 to define a closed-bottom depending channel, and with the central well 21 receiving the central panel 33 and the panels 35, 35 to form a central like depending channel flanked by lateral panels 36, 36. It is there illustrated that the other end portion is being similarly swung down in the direction of the arrow 38 so that the lower portion of the other panel 27, the panel 31 and the panel 30 will be received in the other well 20 to form another like depending channel. This step of breaking the bottom sheet 12 into the assembly jig or form 16 results in the shaping of this sheet which is illustrated in Fig. 4.

Next, the pedestal or column elements 13—13 are nested in the three depending channels which have been broken into the jig wells 20, 21 and 20. Each of the pedestal or column elements 13 in this case preferably is in the form of a chipboard tube which is of a height substantially equal to the depth of each of the depending channels or in this case about 3.75″. Each chipboard tube 13 preferably has an external diameter of about 4.75″ and may have an internal diameter of about 4.5″ to provide a wall thickness of about 0.125″. Since the bottom panel, either 31 or 33, of each of the depending channels initially is about 4.6875″ wide the opposed inner faces of the sidewalls thereof, provided by panels 27 and 30 or 35, 35 as the case may be, will be spaced a distance of about 4.5625″ due to bending characteristics of the sheet material. Thus the external diameter 4.75″ of each tube 13 is slightly greater than this internal width 4.5625″ of each of the depending channels and, in order to nest each tube in the latter, it must be distorted to oval cross-sectional shape, as indicated by the arrows 39, 39 in Figs. 4 and 5. The resiliency of the sidewall 40 of each tube 13 will cause it to be sprung or clamped in such distorted oval cross-sectional shape in the respective depending channel between sidewalls 27, 30 or 35, 35, as the case may be, consequently, to be securely clamped in the nested position due to the fact that the walls of the wells of the assembly jig or form effectively hold these channel sidewalls in position. Such distortion of the resilient sidewall 40 of each of the tubes 13 is illustrated to an exaggerated degree in Fig. 5 wherein is shown in dotted lines the cylindrical shape of this tube prior to the distortion, due to squeezing in the opposite directions indicated by the arrows 39, 39, to the oval cross-sectional shape indicated in full lines therein. With the sidewalls of the depending channels formed in the bottom sheet 12 securely confined by the partition and endwalls of the assembly jig or form 16, the plurality of nested tubes 13—13 are frictionally held in such distorted shapes to spring or clamp them in their nested positions throughout the subsequent steps of assembling the parts of the pallet, and they are likewise so held in such nested positions throughout the useful life of the pallet since provision is made in the finished structure for holding these channel sidewalls in such positions to prevent spreading thereof. It will be seen from Fig. 4 that in this case three such tubes 13—13 preferably are nested in each of the depending closed-bottom channels and appreciably spaced apart to permit, if desired, entry therebetween of fork tines when the sidewalls of the depending channels are slotted as proposed hereinafter.

The plurality of transversely-extending, elongated, depending, closed-bottom channels defined in the bottom sheet 12, whether reinforced or not by column elements or tubes 13—13 or otherwise, technically may be considered to be supporting beam structures as well as upwardly-extending column structures having considerable lateral dimension in one direction, but since such elements are not unique in and of themselves, in pallet structures generally and are well understood in the pallet art as to their actions and functions under a variety of conditions there is no need here to detail such technical functioning of these channels. Hereinafter, wherever reference is made to "depending bottom beam structures," "bottom beam channel structures," "depending beam channels" and the like, it is to be understood that thereby is intended identification of such transversely-extending or laterally-running, elongated, depending structures, or equivalents thereof; such equivalents possibly being elongated laterally-extending structures which are not of channel formation in cases of the use of the broader of such terms, such as "depending bottom beam structures" and "bottom beam structures."

As indicated in Fig. 1, the top sheet 11, which may be formed of similar corrugated paper but, if desired, having a greater test strength, is also of general rectangular shape and, for the pallet illustrated by way of example in the drawings, may be about 64.5" long and about 46.25" wide with its flutes running longitudinally thereof, as indicated at 14. In order to attain maximum economy, the sheet parts 11 and 12 of the pallet structure, illustrated by way of example in the drawings, are designed to be produced by conventional rotary equipment of paperboard box factories to accomplish the scoring thereof and also to shape and slot the deck sheet 11. Accordingly, the deck or top sheet 11 preferably is notched at its four corners 41—41, and end zones or flaps 42, 42 are defined thereon by transvers score lines 43, 43 and these notches. Panels 44, 44 are defined between the score lines 43, 43 and double transverse score lines 45, 45 inward of the corner notches 41—41. Additional transverse score lines 46, 46 define with the double score lines 45, 45 panels 47, 47. Together the panels 42, 44 and 47 at each end of the deck sheet 11 constitute a foldable end zone 48 to be employed in the construction of an upstanding beam structure, as hereinafter explained. Notches 49—49 in the side edges of the deck sheet 11 are substantially aligned with the score lines 46, 46 to define with corner notches 41—41 beam end flaps 50—50 adapted to be doubled along the double score lines 45, 45. Longitudinal score lines 51, 51 are provided along the side edges to define side flaps 52, 52. The end flaps 42, 42 and side flaps 52, 52 in this case may be of a width of about 2.5625" in the embodiment of the pallet illustrated in the drawings. The panels 47, 47 may be of a width of about 2.875" and the panels 44, 44 may be of a width of about 2.75", so that the remaining rectangular tray bottom panel 53 is about 47.625" long and 41.125" wide.

After the bottom sheet 12 has been broken into the form 16 and the tubes 13—13 nested in the beam channels provided therein, as illustrated in Fig. 4, the top or deck sheet 11 is seated crosswise upon the bottom sheet panels 36, 36 and between the upstanding end flaps 25, 25 and upper portions of panels 27, 27 of the bottom sheet, as will be seen from Fig. 6. This will abut in face-to-face relation the side flaps 52, 52 of the deck sheet 11 to the upper portions of the bottom sheet panels 27, 27, and the bottom sheet end flaps 25, 25 will then be folded down over these deck sheet side flaps, as indicated by the arrow 54 in the left side of Fig. 6, to the enveloping position as shown in the right side of Fig. 6. Then, at each end the enveloping flap 25 and the upper portion of the panel 27 will be securely connected to the intervening side flap 52, such as by means of through staples 55, 55, to form upstanding opposite side rim structures 56, 56 with both thereof being shown in a completed form in Fig. 7.

The remaining opposite scored marginal end zones 48, 48 of the top or deck sheet 11 are folded up in the following manner to provide side rim structures which are to constitute upstanding load-suspending beams and, it is to be understood, that these may be folded up either before or after the formation of the edge rims 56, 56. Each of the end flaps 42 of deck sheet 11 will be folded inward along score line 43 down upon the panel 44 in the direction of the arrow 57 in Fig. 6. The lapped end flap 42 and panel 44 will then be folded inward and down upon the panel 47 along the double score line 45 in the direction of the arrow 58 in Fig. 6. This infolding of each of the marginal end zones 48 of the top or deck sheet 11 forms a triple-ply beam structure 59 along the remaining opposed edges of the tray bottom panel 53 with any suitable means, such as through staples 60—60 extending therethrough being employed to hold the plies together, as will be understood from Fig. 7. Each beam structure 59 is thereafter turned up in the direction of the arrows 61, 61 in Fig. 7 to form additional edge rims to define with edge rims 56, 56, and the panel 53 a rectangular load-supporting tray, as will be understood from Fig. 8.

Since the tendency of the distorted tubes 13—13 to return to their cylindrical shapes, due to the resiliency of the sidewalls thereof, applies pressure against the inner faces of the sidewalls of the depending beam channels formed in the bottom sheet 12 when withdrawn from the assembly jig or form 16, means are provided to anchor these depending beam channel sidewalls in their initial tube-confining positions. Preferably such means comprise a plurality of staples 62—62 which are clinched through the deck panel 53 and the bottom sheet panels 36, 36, and at preferred locations adjacent the infolded beam structures 59, 59 and the edges of the bottom sheet panels and preferably very near the sidewalls of the depending beam channels, as is indicated in Figs. 7 and 8. The notching at 23—23 of the top edges of the side 17, 17 of the assembly jig or form 16 and the cutting back of the top edges of its partitions 19, 19, 190 and 190 at 123—123 permits insertion at such points beneath the edges of the bottom sheet panels 36, 36 of the anvil of a stapling tool for this purpose. Preferably, such stapling is performed while the infolded beam structures 59, 59 are still flat, as indicated in Fig. 7, and before they are swung up to their upright positions in the directions of the arrows 61, 61, for ease and convenience in performing this stapling operation.

In order to hold the upstanding edge rims 56, 56 and 59, 59 in their upright positions to define the four side lips of the rectangular deck tray structure, provision is made for connecting the ends of these edge rims together. As indicated in Fig. 8, each of the doubled end flaps 50 on the ends of each of the edge rims 59 is turned in and swung down over an end edge of the adjacent edge rim 56 as the edge rim 59 is swung up in the direction of the arrow 61 to its upright position, as is best seen at 63 in Fig. 8. Staples 64—64 are then clinched through each of the lapped or folded end flaps 50 and the end of the edge rim 56 enveloped thereby, securely to connect together the adjacent ends of the four edge rims so that they define together a continuous upstanding ring structure.

Figure 9:
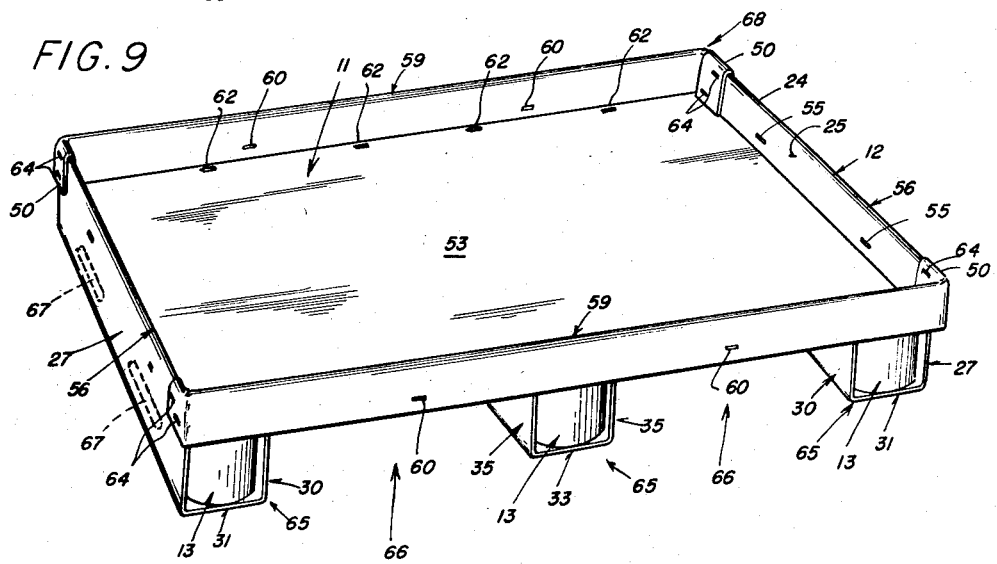
Fig. 9 is a perspective view of the finished embodiment of the device, the assembly of the parts of which are illustrated in Figs. 3 to 8 incl.

The completed pallet shown in Fig. 9 is then withdrawn from the assembly jig or form 16 to be used as a deck tray type of pallet. As will be understood from Fig. 9, the finished pallet structure includes three depending beam channels 65—65, each of which is of a closed-bottom type and rectangular in cross-section, reinforced by a plurality of the upright tubes 13—13 nested therein. Such depending beam channels 65—65 extend transversely across the bottom of the deck tray structure in laterally-spaced relation to define therebetween inverted channels 66, 66 adapted to receive therein the tines of a lifting fork, and it will be understood that for this purpose the central depending beam channel may be omitted, provided that loading requirements are adequately satisfied. Entry of the fork tines thus normally may be limited to two opposite directions from front to back of the two-way entry pallet structure, as viewed in Fig. 9, which in most instances will satisfy the demands of a user who can readily determine by prior study what side of such a loaded pallet he wishes the fork tines of his lift equipment to enter. However, if he wishes to have such pallet structure in the form of a four-way entry device, provision therefor may be made readily by slotting the sidewalls of the depending beam channels 65—65 intermediate the tubes 13—13 nested therein, such as is proposed in dotted lines at 67, 67 in Fig. 9. This, of course, will provide such slots in the lower portions of both of the panels 27, 27, the panels 30, 30 and the panels 35, 35, all in suitable alignment to receive the pair of tines of a lift fork from the ends of the pallet rather than the sides thereof.

The four upstanding edge rims 56, 56 and 59, 59 all are adapted to serve a dual purpose of forming parts of a lip or rim of the rectangular deck tray, and as load-suspending beam structures or together as a continuous ring structure. However, the latter load-suspending function of the two edge rims 59, 59 which extend transversely substantially normal to the depending beam channels 65—65 may be more important in performing such load-suspending function in certain pallets, particularly where the side edge rims 56, 56 are located no great distances from the positions of the fork lift tines in the inverted channels 66, 66, as in the pallet illustrated in the drawings. As will be seen from the diagrammatic illustration in Fig. 10, such deck tray pallet structure 68, as that illustrated in Fig. 9, will be supported upon a pair of fork lift tines, indicated in dotted lines at 69, 69 which have been received in the inverted channels 66, 66. In connection with Fig. 10, let it be assumed that the pallet 68 is loaded. The portions of the static load, which are supported more directly by the fork tines 69, are diagrammatically represented in Fig. 10 by the hatched areas 70, 70. The loaded areas of the tray remote from the fork tines will tend to develop an over-turning effect of the parts of the pallet which lie above or immediately adjacent the fork tines unless the portions of the static load thereon are otherwise carried, and this may be chiefly accomplished by the transverse upstanding edge beams 59, 59 from which the deck board, comprising the tray bottom panel 53 and the bottom sheet panels 36, 36 fastened thereto, is hung or suspended. The portions of the static load which may be supported by upstanding edge beams 59, 59 are diagrammatically represented in Fig. 10 by the hatched areas 71, 71, and it will be seen that there is sufficient overlapping of these areas with the areas 70, 70 to assure such efficient support of the entire static load as effectively to resist bending moments and provide sufficient strength against bending stresses. The upstanding edge beams provided by the side edge rims 56, 56 may support portions of the static load, and their service for this purpose may be needed particularly where such side edges are located quite remote from the tine locations as is the case of a very wide pallet; and the hatched areas 72, 72 diagrammatically represent the portions of the static load which may be supported by these side edge beams. When a load, which may be made up of a plurality of units, such as a number of stacked cartons, is nested in the deck tray of the pallet of the present invention, if the load is secured thereon by steel strapping, which will usually be the case, the strapping itself tends to hold the transverse edge beams against the load units or cartons in fixed rigid positions efficiently to perform their load-suspending functions. Also the edge rims of the deck tray structure protect the load units in the outer faces of the load against damage from such straps and these edge rims efficiently serve as protective bumpers since the overall lateral dimensions of the pallet tray structure are greater than the lateral dimensions of the load supported thereon, thereby holding the faces of the load away from adjacent objects or other pallet-carried loads.

It will be understood that just as in the case of the depending beam channels 65—65 where variations within the scope of the invention are permissible, such as the omission of the central depending beam channel or other means for reinforcing these channels, the structures of the upstanding edge beam structures may be varied within the scope of the invention. For example, the deck tray may not require for some services the use of edge rims 56, 56 if suitable other means are provided or employed for holding the upstanding edge beams 59, 59 in their upright positions and load strapping may serve this purpose, particularly when side edge rims are not needed to hold load units on the deck, as may be the case where certain types of unit loads or loads made up of certain shapes or sizes of units involve little tendency for such loads or units thereof to shift on the deck. Also, it is not necessary that the edge rims 56, 56 involve an interfitting of flaps and panels of both the deck sheet and the bottom sheet since such edge rim structures may be provided by areas of either sheet, but such interfitting of parts of both sheets assures that the sheets will be securely connected together in their relative positions along side edges thereof, as well as in tray bottom panel areas as provided by the stapling at 62—62. Likewise the upstanding edge beams 59, 59 may be formed of fewer or greater numbers of lapped panels and flaps, e.g., the end flaps 42, 42 of the deck sheet may be omitted and, if desired, added edge flaps of the bottom sheet may be inserted between the lapped deck sheet panels 44 and 47.

Embodiments of the pallet of the present invention which have a top tray structure including upstanding rim means may be employed to advantage with load-carrying sleeves nested therein. For example, such a load-carrying sleeve may be in the form of a collapsible sleeve which is rectangular in cross-section when expanded and of such lateral dimensions that the sidewalls thereof will be snugly received inside or telescoped down into the tray rim structure comprising the upstanding edge rims 56, 56, 59 and 59 of the pallet 68, so that the latter serves as a closing bottom for the sleeve. The sidewalls of such rectangular sleeve may be formed of multi-ply material, such as paperboard, and internal bracing, e.g., relatively rigid diagonal elements or sheets that together may constitute an X-shaped bracing structure, may be employed to retain or cooperate with the edge rims in retaining the sleeve in such expanded condition. Loose material may be loaded in such an expanded sleeve, internally braced if desired, and such material may be particulate when the tray deck panel 53 is imperforate as proposed in the illustrated embodiment. A slip top cover may be telescoped over the top end of such sleeve to provide with the latter and the tray pallet a palletized bulk shipping container for the load contents.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A materials handling pallet comprising, in combination, a pair of opposed generally rectangular sheet of paperboard with one serving as a deck tray bottom panel and the other being located therebeneath and transversely folded with provision thereby of a plurality of laterally-spaced depending bottom beam structures extending thereacross and defining therebetween at least one lift fork tine-receiving inverted channel, and at least a pair of upstanding edge rims provided along opposite sides of the tray bottom panel to define with the latter a deck tray structure, said edge rims being formed by folded marginal portions of at least one of said sheets and extending transversely substantially normal to said bottom beam structures to constitute upstanding load-suspending edge beams.

2. A materials handling pallet comprising, in combination, a pair of opposed generally rectangular sheets with one serving as a lateral rectangular bottom panel of a deck tray structure, the other sheet being located beneath the tray bottom panel sheet and being transversely folded with provision thereby of a plurality of laterally-spaced depending bottom beam structures extending across the tray bottom panel and defining therebetween at least one lift fork tine-receiving inverted channel, and four upstanding edge rims provided by folded marginal portions of said sheets along the four side edges of the tray bottom panel with said rims being connected together at their ends to define with said tray bottom panel the deck tray structure, the opposed pair of said rims which extend transversely substantially normal to said bottom beam structures constituting upstanding load-suspending edge beams.

3. The pallet as defined in claim 2 characterized by each of said bottom beam structures being in the form of a closed-bottom channel structure, and a plurality of stiffening support units nested in said bottom beam channel structures.

4. The pallet as defined in claim 3 characterized by each of said support units being in the form of an upwardly-extending tube.

5. The pallet as defined in claim 4 characterized by each of said tubes having a relatively thin resilient side wall distorted by pressure transversely of the bottom beam channel structure in which it is nested and confined in distorted condition by opposite sides of said channel structure thereby being clamped in its mounted position.

6. The pallet as defined in claim 5 characterized by means securing said bottom sheet to said deck sheet in areas of the inverted channel and limiting lateral movement of the sides of each of said channel structures away from each other to maintain the clamping action thereof on said tubes.

7. The pallet as defined in claim 4 characterized by said sheets being of paperboard and said tubes being paperboard tubular sections.

8. The pallet as defined in claim 2 characterized by said opposed pair of upstanding edge rim beams being formed of folded marginal portions of said deck sheet with sections thereof fastened together, and the remaining opposed pair of upstanding edge rims being formed of marginal portions of both of said sheets folded and fastened together.

9. An expendable materials handling pallet comprising, in combination, a pair of stacked generally rectangular sheets of paperboard with the top one thereof serving as a lateral rectangular bottom panel of a deck tray structure, the other bottom sheet being located therebeneath and fastened thereto with said bottom sheet being transversely folded to provide at least a pair of substantially parallel laterally-spaced depending bottom supporting beam structures and defining therebetween at least one lift fork tine-receiving inverted channel with each beam structure being in the form of a closed-bottom channel, a plurality of upright paperboard tubes nested in each of said depending channels beneath said deck sheet, and four upstanding edge rims provided by folded marginal portions of said sheets along the four side edges of the tray bottom panel and defining therewith the deck tray structure with the ends of said rims being connected together to form a continuous ring structure, an opposed pair of said rims extending transversely substantially normal to and across said depending bottom channels and constituting upstanding load-suspending top edge beams.

10. The pallet as defined in claim 9 characterized by each of said paperboard tubes being initially cylindrical and of an outer diameter slightly larger than the internal width of the beam channel in which it is nested, the sidewall of each of said tubes having natural resilience and being distorted to oval cross-sectional shape when sprung into the depending channel with the latter clamping said tube in mounted position.

References Cited in the file of this patent

UNITED STATES PATENTS

| | | |
|---|---|---|
| 2,385,407 | Endress | Sept. 25, 1945 |
| 2,503,240 | Cahners | Apr. 11, 1950 |
| 2,528,413 | Budd | Oct. 31, 1950 |
| 2,534,010 | Frye | Dec. 12, 1950 |
| 2,571,748 | Newman | Oct. 16, 1951 |
| 2,611,569 | Coleman et al. | Sept. 23, 1952 |
| 2,643,080 | Vogel | June 23, 1953 |